(12) United States Patent  
Hatta et al.

(10) Patent No.: US 7,494,173 B2
(45) Date of Patent: Feb. 24, 2009

(54) RETRACTABLE VEHICLE SEAT OF LATERALLY FOLDING TYPE

(75) Inventors: Susumu Hatta, Akishima (JP); Takayuki Yoshiga, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 158 days.

(21) Appl. No.: 11/581,386

(22) Filed: Oct. 17, 2006

(65) Prior Publication Data
US 2008/0093875 A1    Apr. 24, 2008

(51) Int. Cl.
*B60N 2/04* (2006.01)
(52) U.S. Cl. .................................. 296/65.12
(58) Field of Classification Search ............ 296/63, 296/65.01, 65.05, 65.08, 65.09, 65.11, 65.12, 296/65.16–18; 297/314, 315, 325, 326, 330, 297/331, 334, 335
See application file for complete search history.

(56) References Cited

U.S. PATENT DOCUMENTS

| | | | | |
|---|---|---|---|---|
| 1,747,717 A | * | 2/1930 | Hummert | 248/240.4 |
| 4,740,030 A | * | 4/1988 | Nordskog | 297/13 |
| 5,492,389 A | * | 2/1996 | McClintock et al. | 297/14 |
| 5,707,103 A | * | 1/1998 | Balk | 297/13 |
| 5,984,397 A | * | 11/1999 | Dawson et al. | 296/65.09 |
| 6,106,066 A | * | 8/2000 | Moffa et al. | 297/332 |
| 6,460,929 B2 | * | 10/2002 | Kamida | 297/344.1 |
| 6,843,526 B2 | * | 1/2005 | Honda et al. | 297/14 |
| 6,886,878 B2 | * | 5/2005 | Schambre et al. | 296/65.09 |

FOREIGN PATENT DOCUMENTS

| JP | 05-170021 | 7/1993 |
|---|---|---|
| JP | 09-193699 | 7/1997 |

* cited by examiner

*Primary Examiner*—H Gutman
(74) *Attorney, Agent, or Firm*—Browdy and Neimark, P.L.L.C.

(57) ABSTRACT

A retractable seat of laterally folding type wherein a seat portion thereof is caused by a motor to displace in a direction laterally of a vehicle. The seat portion is pivotally connected, via connecting arm and support elements, with a support base element provided in the vehicle body. The motor and drive transmission elements are securely provided in the seat portion, such that the motor is operatively connected via the drive transmission element with a drive shaft fixed to one end of the connecting arm. Operation of the motor causes displacement of the seat portion in the direction laterally of the vehicle body toward one of a use position on a floor and a non-use storage position where the seat portion extends upright adjacent to a lateral side of the vehicle. The motor is controlled by electric and electronic elements and systems.

8 Claims, 5 Drawing Sheets

RETRACTABLE VEHICLE SEAT OF LATERALLY FOLDING TYPE

BACKGROUND OF THE INVENTION

1. Field of the Invention

The present invention relates to a retractable vehicle seat of laterally folding type, which is basically composed of a seat cushion and a seat back and allows the seat to be folded in a lateral direction of vehicle relative to a support arm fixed on one lateral side of the vehicle, so that a user can fold down the seat from a non-use storage position where it is to be located on one lateral side of vehicle, in a direction to a use position where it is to be located inwardly of the vehicle to supportively receive the user thereon, and that the user can also retract the seat at that use position back to the afore-said non-use storage position. In particular, the invention is directed to a powered retractable vehicle seat of this kind which has an electric motor as a drive source to cause such lateral folding of seat between the non-use storage and use positions relative to the support arm.

2. Description of Prior Art

There has been known a retractable seat of laterally folding type for use in a vehicle. This sort of seat is typically used as a rear seat, and particularly used as a third seat in a relatively large vehicle such as station wagons, vans and various multipurpose cars. As stated above, the seat is foldable in a direction laterally of a vehicle and normally set in a non-use storage position where it is disposed adjacent to one lateral side of the vehicle, thereby normally providing a wide space or an enlarged load-carrying platform in the rearward portion of the vehicle. A user can manually fold down the seat from that non-use storage position to a horizontal use position where it extends horizontally from one lateral side of vehicle, thereby providing an extra seat on which the user can sit. Of course, when in no use, the user can tip up the seat from that use position and retract it to the non-use storage position on one lateral side of vehicle. Hence, this sort of retractable seat is of the so-called "laterally folding type" and has been disclosed for instance from the Japanese Laid-Open Patent Publication No. 9-193699.

Also, known is a powered type of such laterally folding seat which has a motor operatively connected with a seat, such that the motor is electrically operated to cause the seat to displace laterally of vehicle towards a selected one of the non-use storage position and use position as mentioned above. This powered type is disclosed from the Japanese Laid-Open Patent Publication No. 5-170021 (hereinafter, "JPB '021") for example.

According to the JPB '021, a seat is operatively connected, via motor and lead screw mechanism, with a bracket provided on a slide rail device which is disposed at one lateral side of vehicle. Specifically, a seat cushion of the seat is pivotally connected with the said bracket, and a lead screw is movably connected between the seat cushion and the slide rail, with a gear box provided with the motor being threadedly engaged about that lead screw (i.e. the gear box includes a nut threadedly engaged about the lead screw). The gear box is pivotally connected with a lateral side of the seat cushion which faces to the slide rail device. Operation of the motor results in both of the gear box and motor translating on and along the longitudinal direction of the lead screw in either of seat use direction and seat non-use direction. That is, operating the motor in the seat use direction causes movement of the gear box along the lead screw in a direction inwardly of the seat cushion, thereby causing the seat to fold down from the non-use storage position to the horizontal use position. Conversely, operating the motor in the seat non-use direction causes movement of the gear box along the lead screw in a direction outwardly of the seat cushion, thereby causing the seat to tip up or retract from the use position to the non-use storage position.

However, the JPB '021 has been found defective in that:

(i) Both gear box and motor are free to rotate via link with respect to the seat cushion, which means that a vibration during running of vehicle causes undesired movement of those gear box and motor, with the result that the motor itself generates an undesired rattling which will give an unpleasant noise to a seat occupant.

(ii) During operation, a load from the seat is directly exerted on the lead screw, and therefore, it is required that the lead screw and a pin which pivotally supports the lead screw should be provided with an increased rigidity enough to withstand such load applied from the seat, by increasing a thickness of each of those two elements and adding a reinforcing element thereto. As a result thereof, a whole structure of seat becomes great in weight and size and also becomes complicated.

(iii) A free end portion of the lead screw extends in a direction transversely of seat cushion, which requires formation of a hollow or storage portion in the seat cushion to house such free end portion. This will adversely deform the shape and thickness of the seat cushion and deteriorate the cushiony touch thereof.

SUMMARY OF THE INVENTION

In view of the above-stated drawbacks, it is a primary purpose of the present invention to provide an improved retractable seat of laterally folding type which is of simplified structure and avoids the above-described rattling of motor due to vibration.

In order to achieve such purpose, a retractable seat of laterally folding type in accordance with the present invention is basically comprised of:

a support base element provided in the body of the vehicle;

a connecting arm having: one end rotatably connected via a shaft with the support base element; and another end fixedly connected with the seat portion;

a motor securely provided in the seat portion, the motor being electrically connected with a switch element;

a drive shaft rotatably supported in the seat portion so as to be in parallel with the shaft associated with the connecting arm;

a drive transmission means operatively connected between the motor and the drive shaft;

a first support link means having: one end fixed to the drive shaft; and a free end; and a second support link means having: one end pivotally connected with the support base element; and another end pivotally connected with the free end of first link means, wherein operation of the motor by turning on the switch element results in rotation of the drive shaft which in turn causes movement of both first and second support means, thereby causing rotation of the connecting arm relative to the shaft, whereby the seat portion is displaced in the direction laterally of the vehicle body toward a selected one of the use position and the non-use storage position.

Accordingly, the motor is securely provided in the seat portion, which is effective in preventing the motor from being rattling due to a vibration during running of the vehicle. This means that no unpleasant noise is generated from the motor.

Preferably, the seat cushion of the seat portion may include: one lateral side facing to the support base element;

and another lateral side adjoining that one lateral side, and wherein those drive shaft and another end of the connecting arm may be disposed adjacent to the afore-said one lateral side of the seat cushion, while on the other hand, the motor be securely connected with the afore-said another lateral side of the seat cushion.

Preferably, a limit switch element is provided, which detects excessive operation of the motor.

As one aspect of the present invention, the motor may be a geared motor having a pinion gear, and a sector gear be integrally fixed to the drive shaft. Further, the drive transmission means may comprise a reduction gear unit including: a first gear in mesh with the pinion gear; and a second gear in mesh with the sector gear.

As another aspect of the present invention, a detector element may be provided to the seat portion, which is adapted to detect whether the seat back is folded onto the seat cushion, or not, with such an arrangement that, only when the detector determines that the seat back is folded onto the seat cushion, the switch element is operable to cause operation of the motor.

As still another aspect of the present invention, a manual lock means may be provided to the seat, which is operable manually to lock and unlock the seat portion to and from the floor of the vehicle, and a lock sensor means may be provided for detecting whether the seat portion is completely locked to or completely unlocked from the floor of vehicle.

Other various features and advantages will become apparent from reading of the descriptions hereinafter, with reference to the annexed drawings.

DETAILED DESCRIPTION OF PREFERRED EMBODIMENT OF THE INVENTION

Referring to FIGS. 1 through 10, there is illustrated a preferred exemplary embodiment of powered retractable vehicle seat of laterally folding type, as generally designated by (S), in accordance with the present invention.

In brief, the powered retractable vehicle seat (S) itself is comprised of a seat portion (18) and a laterally folding mechanism (10) which is electrically operated to fold and unfold the seat portion (18) in a direction laterally of a vehicle (26). As is known, the seat portion (18) comprises a seat cushion (16) and a seat back (20) which is rotatably connected with the seat cushion (16) via an unshown pivot or reclining device, such that the seat back (20) may be folded onto the seat cushion (16) and unfolded or tipped up therefrom to a vertically extending use position.

Designations (25) and (26A) denote a floor of vehicle and a securing portion defined in the right lateral side (at R) of vehicle (26), respectively.

In brief, the laterally folding mechanism (10) is operatively provided between such securing portion (26A) and the aforesaid seat cushion (16). In this respect, the seat portion (18) may be rotatively displaced by operation of such laterally folding mechanism (10) towards a selected one of a use position shown in FIG. 1 and a non-use storage position shown in FIG. 5. Normally, as in the FIG. 5, a folded seat portion (18) wherein the seat back (20) has been folded onto the seat cushion (16) is set in the non-use storage position where the seat portion (18) extends vertically from the securing portion (26A). On the other hand, as shown in FIG. 1, an unfolded seat portion (18) wherein the seat back (20) sands upright from the seat cushion (16) is set in the use position where that seat portion (18) extends laterally from the securing portion (26A), with the seat cushion (16) in contact on the floor (25).

It should be noted that the term, "forward" or "forwardly", refers to a side (F) forwardly of the seat (S) or seat portion (18), whereas the term, "backward" or "backwardly", refers to a side (B) forwardly of the seat (S) or seat portion (18). Also, it should be noted that the term, "right", "right-side", or "rightward", refers to one lateral side (R) rightward of the the seat (S) or seat portion (18), whereas the term, "left", "left-side", or "leftward", refers to another lateral side (L) leftward of the seat (S) or seat portion (18).

The seat cushion (16) has a seat cushion frame (14) provided therein. The seat cushion frame (14) is basically formed by a forward frame member (14B), a backward frame member (14D), a right-side frame member (14A) and a left-side frame member (14C). The forward frame member (14B) comprises a first frame member (14B-1) and a second plate frame member (14B-2) having a widened area wider than the first frame member (14B-1).

Figure 1:
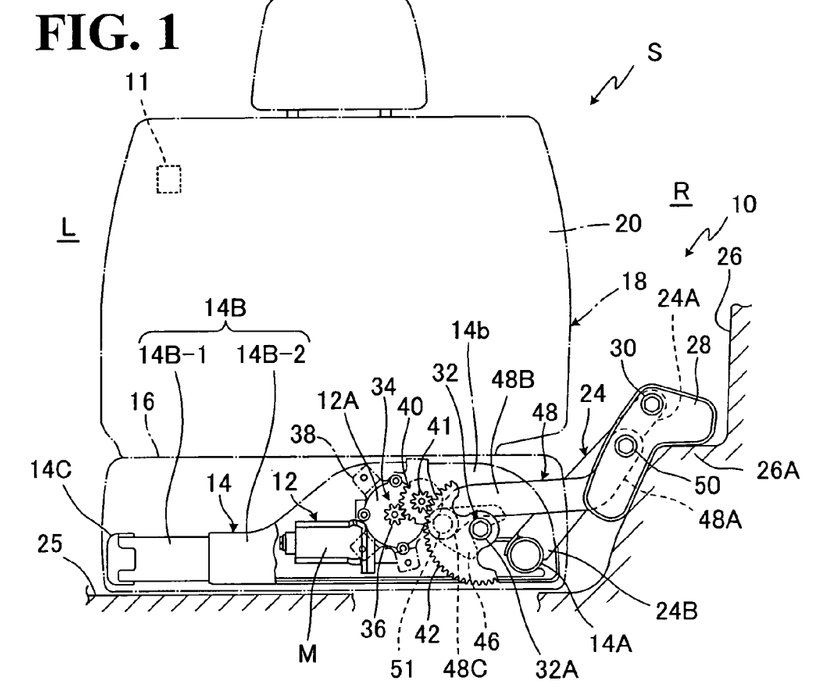
FIG. 1 is a schematic front view showing a whole of the retractable seat of laterally folding type in accordance with the present invention.
Figure 2:
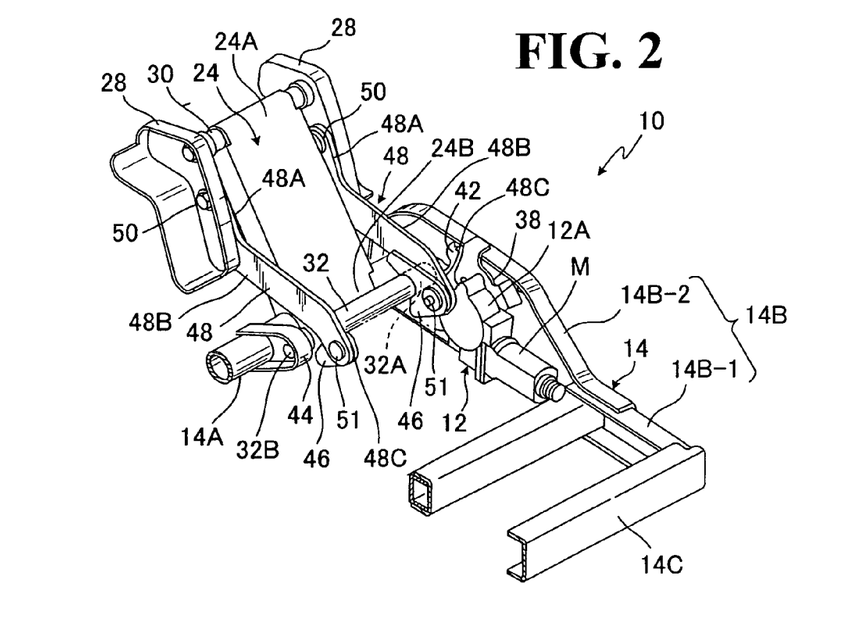
FIG. 2 is a partly broken schematic perspective view of a laterally folding mechanism in the retractable seat of laterally folding type.
Figure 3:
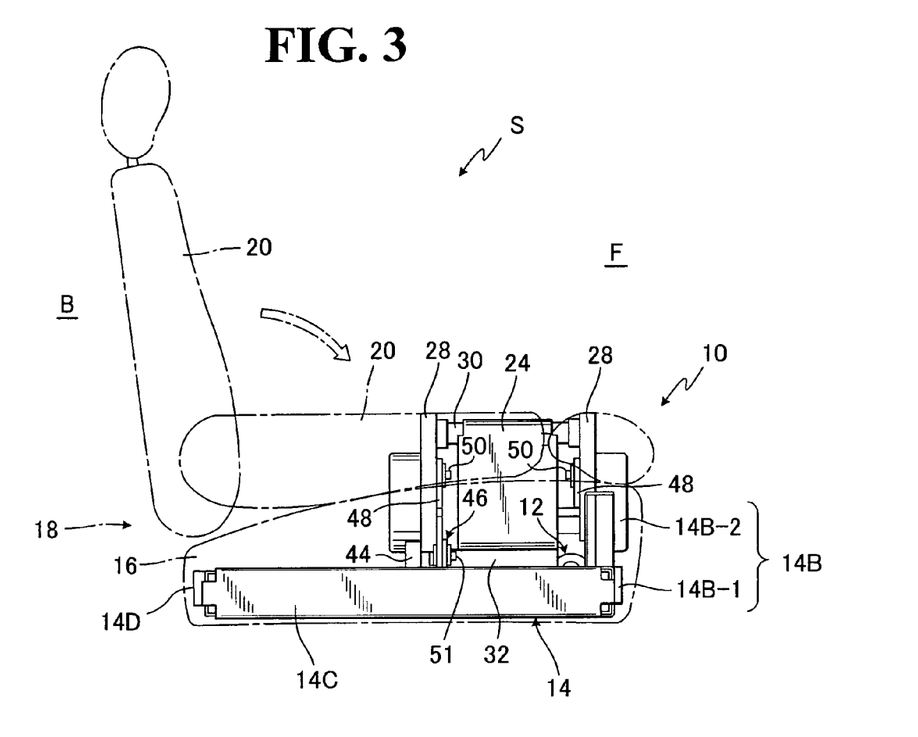
FIG. 3 is a schematic side view of the retractable seat of laterally folding type.

As understandable from FIGS. 1 and 2, a pair of spaced-apart support base brackets (28) (28) are fixedly mounted on the securing portion (27) defined in the right lateral side (at R) of vehicle (26). Rotatably connected between such two support base brackets (28) is a shaft (30) forming a center of rotation of a connecting arm (24).

The connecting arm (24) has one end (24A) fixed to the afore-said shaft (30) and another end (24B) integrally fixed to the right-side frame member (14A) of seat cushion frame (14).

Figure 5:
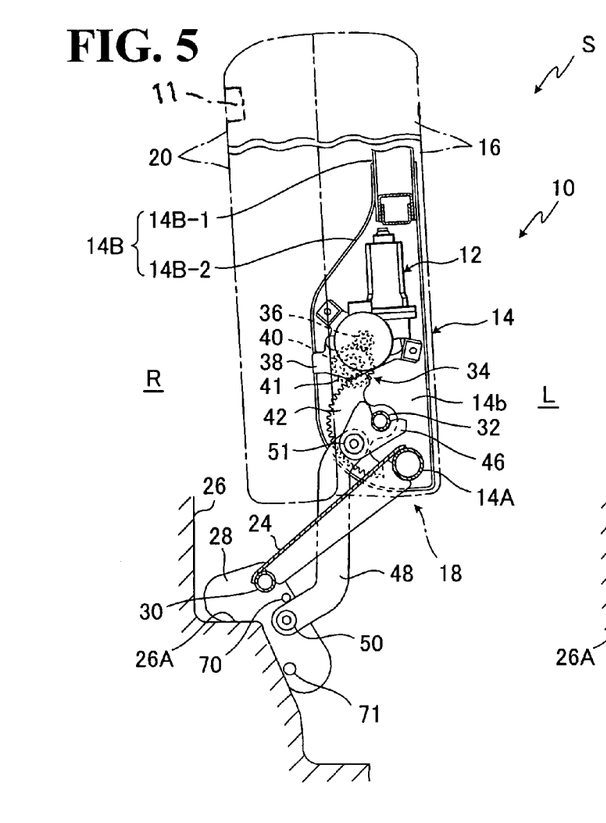
FIG. 5 is a sectional view of the retractable seat of laterally folding type as viewed from the back side thereof, which shows the seat as being set in a non-use storage position.

It is noted here that, as can be seen from FIGS. 1 and 5, the connecting arm (24) itself has integral and angular connection with the right-side frame member (14A) or the seat cushion frame (14) at a predetermined angle, such that, in the use position shown in FIG. 1, the connecting arm (24) slopes downwardly from the support base bracket (28) toward the seat cushion frame (14), while the seat cushion frame (14) extends horizontally from the end (24B) of the connecting arm (24) in parallel with a horizontal plane of the floor (25), and that, in the non-use storage position shown in FIG. 5, the connecting arm (24) slopes upwardly from the support base bracket (28) toward the seat cushion frame (14), while the seat cushion frame (14) extends vertically from the end (24B) of the connecting arm (24) so as to be substantially perpendicular with the horizontal plane of floor (25).

As seen in FIGS. 1 and 2, a geared motor (12) and a drive transmission means (34) are securely provided to an inwardly facing surface of the second plate frame member (14B-2) associated with the forward frame member (14B).

The geared motor (12) is known in the art, which typically comprises an electric motor (M) and a gear box (12A) provided to a drive shaft of motor (M). Designation (36) denotes a pinion gear projected outwardly from the gear box (12A).

A first gear (40) and a second gear (41) smaller than the first gear (40) are provided as a drive transmission means generally designated by (34) for transmitting a drive force of the geared motor (12) to the drive shaft (32). As shown, the first gear (40) is in mesh with the pinion gear (36) and a second gear (41) is concentrically fixed to the first gear (40). Those two gears (40) (41) also forms a reduction gear unit, as is known.

The geared motor (12) is securely connected via a support bracket (38) with the inward surface of second plate frame member (14B-2). The afore-said first and second gears (40) (41) are rotatably disposed between the support bracket (38) and the second plate frame member (14B-2). The second gear (41) is in mesh with the sector gear (42). It is to be seen that the first gear (40) serves as an input gear for inputting a drive force of the motor (12) to the second gear (41), and that the second gear (41) serves as an output gear for reducing and outputting the drive force to the sector gear (42).

The sector gear (42) is fixedly connected with one end (32A) of a drive shaft (32) at a point adjacent to the inward surface of the second plate frame member (14B-2). As seen in FIG. 2, the drive shaft (32) is at such one end (32A) rotatably coupled with the second plate frame member (14B-2) and at another end (32B) rotatably coupled with a support bracket (44) fixed on the right-side frame member (14A). It is noted that the drive shaft (32) itself extends in parallel with the shaft (30).

As shown in FIG. 2 in conjunction with FIG. 1, a pair of first support links (46) (46) are fixed to the afore-said drive shaft (32). It is noted here that the FIGS. 1 and 2 show the use position of seat (S), with those two first support links (46) projecting inwardly of the seat cushion frame (14).

Designations (48) and (48) denote a pair of second support links, each being of generally "S" shape having: one end portion (48A) curved or bent in one direction, another end portion (48C) curved or bent in another direction opposite to that one direction; and an intermediate rectilinear portion (48B) defined between those two end portions (48A) (48C).

As best shown in FIG. 2, each of such two second support links (48) is at one end portion (48A) thereof rotatably connected with the lower shaft (50) extended between the two securing brackets (28), while being at another end portion (48B) thereof rotatably connected with each of the two first support links (46) via a pin (51).

It is to be appreciated that the geared motor (12), drive transmission means (34) and sector gear (42) are securely and collectively provided to the inward surface of the second plate frame member (14B-2), which means that, in contrast to the previously described prior art, (i) all those mechanical elements (12, 34 and 42) are disposed adjacent to the lateral side of the seat cushion (16) and they therefore are not touched by a buttocks portion of a seat occupant on the seat cushion (16), hence insuring to provide a good cushiony touch of the seat cushion (16), and (ii) a whole of the motor (M) itself is fixed to and along the side frame member (14B) of seat cushion frame (14) and therefore completely prevented against rattling due to vibration during running of the vehicle.

Figure 9:
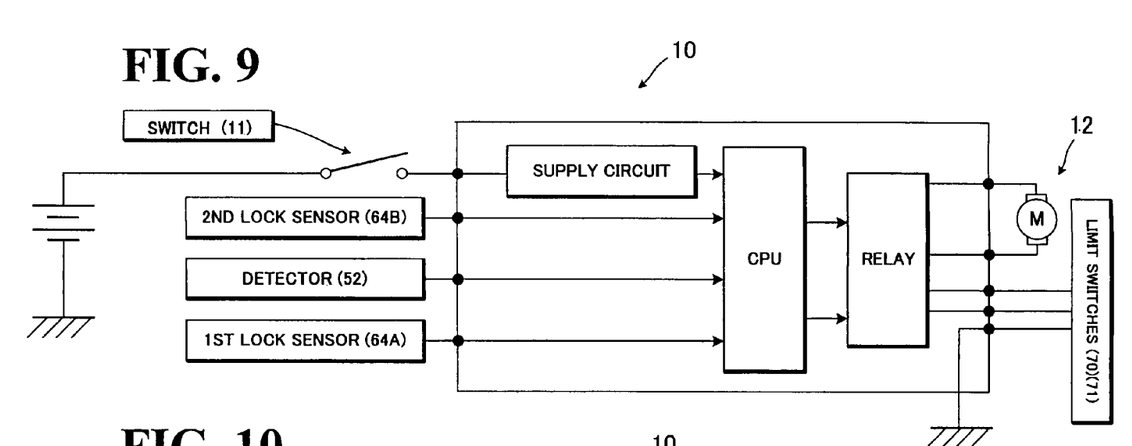
FIG. 9 is a block diagram showing electric connection among electric and electronic elements including the aforesaid detector, which are adapted for controlling a motor in the present invention.
Figure 10:
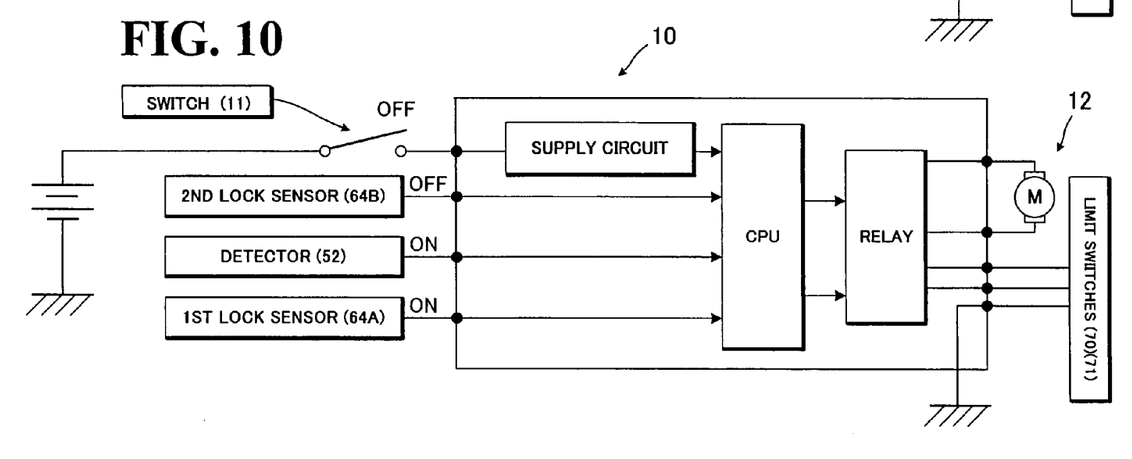
FIG. 10 is a block diagram basically identical to the block diagram in the FIG. 9, which indicates that, the motor can be operated, irrespective of "off" state of a start switch, to retract the seat to the non-use storage position

As will be elaborated later, the geared motor (M) is for example electrically connected with a start switch (11) and may be properly controlled via electric or electronic elements, as shown in FIGS. 9 and 10.

Normally, a whole of the seat (S) is set in the non-use storage position, as indicated in FIG. 5, with the folded seat portion (18) (i.e., the seat back (20) is folded onto the seat cushion (16)) extending upright from the securing portion (26A) in the vicinity of the right lateral side (at R) of vehicle (26).

Figure 4:
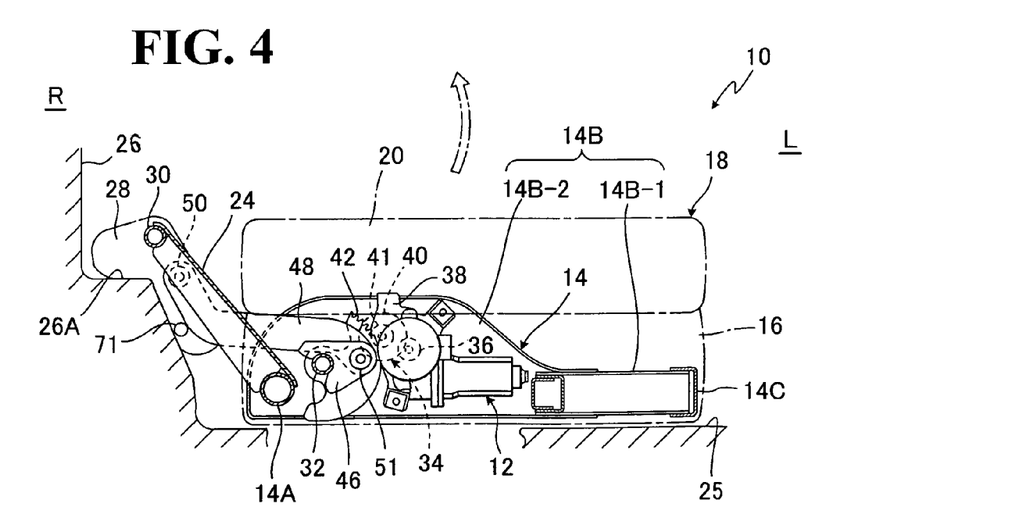
FIG. 4 is a sectional view of the retractable seat of laterally folding type as viewed from the back side thereof, which shows the seat as being set in a use position.
Figure 6:
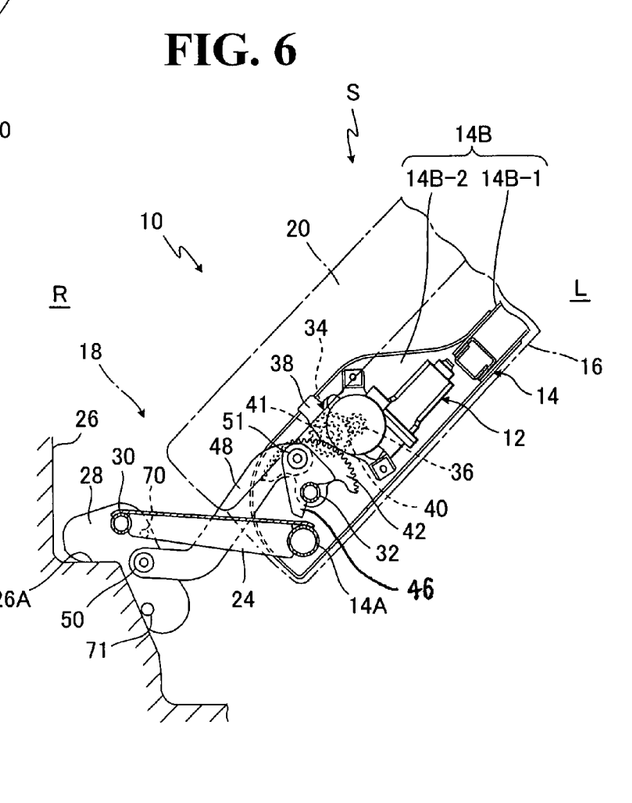
FIG. 6 is a sectional view of the retractable seat of laterally folding type as viewed from the back side thereof, which shows the seat as being at a midway point between the use position and the non-use storage position.
Figure 7:
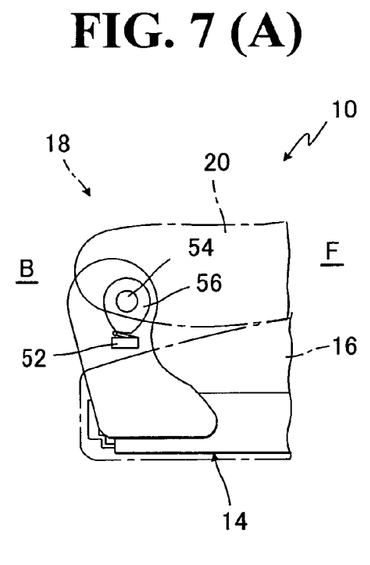
FIG. 7(A) is a diagram for showing that a detector provided in the retractable seat of laterally folding type has detected that a seat back is folded onto a seat cushion.
FIG. 7(B) is a diagram for showing that such detector detects that the seat back is unfolded from the seat cushion to an upright use position.
Figure 8:
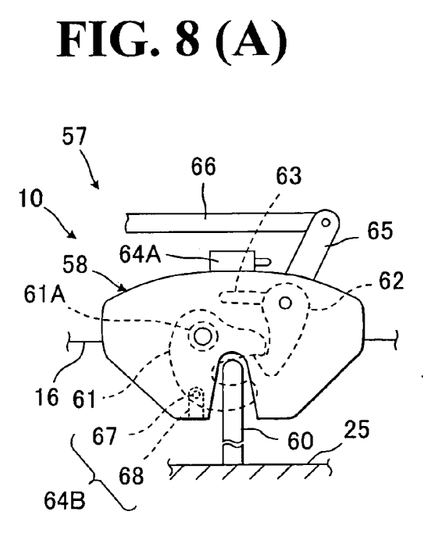
FIG. 8(A) is a front view of a lock mechanism for locking and unlocking the seat cushion to a floor of vehicle, which shows the state where the seat cushion is locked to the floor of vehicle.
FIG. 8(B) is a front view of the foregoing lock mechanism, which shows the state where the seat cushion is unlocked from the floor of vehicle.

When it is desired to use the thus-stored seat (S), the start switch (11) is turned on in a given seat use direction (not shown), so that the geared motor (12) is operated in a normal direction, thereby causing both sector gear (42) and drive shaft (32) to simultaneously rotate in clockwise direction, through the first and second gears (40) (41), which in turn causes simultaneous clockwise rotation of both two first support links (46) relative to the drive shaft (32). As a result thereof, as shown in FIG. 6, both two second support links (48) are drawn by the respective two first support links (46) toward the left side (L), while being rotated downwardly about the lower shaft (50), which causes simultaneous downward rotation of the connecting arm (24) about the upper shaft (30), whereupon the folded seat portion (18) or a whole of the seat (S) is rotated downwardly about that upper shaft (30) in leftward direction. Then, as shown in FIG. 4, the folded seat portion (18) is set in the use position, with the seat cushion (16) thereof extending horizontally from the right lateral side (at 25) of vehicle body and being in contact upon the floor (25). Thus, the seat back (20) may be flipped over from the seat cushion (16) to an upright use position, as shown in FIG. 1, so that a seat occupant can sit on such unfolded seat portion (18), Conversely, when it is desired to return the seat (S) from the foregoing use position to the non-use storage position shown in FIG. 5, the seat back (20) is first folded onto the seat cushion (20) as indicated by the two-dot chain lines and arrow in FIG. 3, and then, the start switch (10) is turned on in a given seat storage direction (not shown). Responsive thereto, the geared motor (12) is operated in a reverse direction, thereby causing both sector gear (42) and drive shaft (32) to simultaneously rotate in anticlockwise direction, through the first and second gears (40) (41), which in turn causes simultaneous anticlockwise rotation of both two first support links (46) relative to the drive shaft (32). As a result thereof, as viewed from FIG. 4 to FIG. 6 in sequence, both two second support links (48) are drawn by the respective two first support links (46) toward the right side (R), while being rotated upwardly about the lower shaft (50), which causes simultaneous upward rotation of the connecting arm (24) about the upper shaft (30), whereupon the folded seat portion (18) or a whole of the seat (S) is rotated upwardly about that upper shaft (30) in rightward direction. Then, as shown in FIG. 5, the folded seat (18) is set in the non-use storage position, with the folded seat portion (18) thereof extending vertically in the vicinity of the right lateral side (at R) of vehicle (26), hence providing an increased space in the vehicle (26).

In the present invention, of course, the geared motor (12) or motor (M) is controlled properly by a predetermined electric circuit, electric switches and electronic control element so as to not only insure controlled operation of the motor (M), but also to insure controlled operation of the above-described laterally folding mechanism (10).

For example, as shown in FIG. 5, an upper limit switch (70) and lower limit switch (71) may be provided so as to limit upward and downward rotation of the seat portion (18) relative to the shaft (30). As understandable from FIGS. 7 and 8, those two limit switches (70) (71) are electrically connected with the motor (M). If the geared motor (12) continues to operate in the reverse direction to cause excessive rightward rotation of the seat portion (18) beyond the non-use storage position shown in FIG. 5, the second support link (48) is bought to contact with the upper limit switch (70) which then operates to immediately stop flow of current to the motor (M), thereby insuring to stop the seat portion (18) at the non-use storage position as shown in FIG. 5. On the other hand, as understandable from FIG. 4, when the seat (S) reaches the use position, the second support link (48) is brought to contact with the lower limit switch (71) which then operates to immediately shut off the current to the motor (M), thereby preventing overrun of that motor (M) and incidental damages of seat back frame (14) or the seat back (16).

As shown in FIGS. 7(A) and 7(B), a cam (46) is fixed to a hinge (54) by which the seat back (20) is rotatably connected with the seat cushion (16), and also, a detector (52) is disposed adjacent to the cam (46). Such combination of the cam (46) and detector (52) is effective in detecting whether the seat back (20) is folded onto the seat cushion (16), or positioned at the use position where the seat back (20) is unfolded from the seat cushion (16) and stands upright. Namely, when the seat back (20) is folded onto the seat cushion (16) to provide a folded seat portion (18), the cam (46) depresses on the detector (52), as in FIG. 7(A). The detector (52) therefore detects that the folded seat portion (18) is ready for displacement toward either of the use position and non-use storage position, and so determines the CPU, as understandable from the circuit block diagrams in FIG. 9. Hence, as far as the detector (52) is "on" state, the CPU gives instruction to the motor (M) for either of normal and reverse operations, so that, unless the seat back (20) is unfolded from the seat cushion (16), to turn on the start switch (11) will result in the seat portion (18) or the seat (S) being displaced from the non-use storage position shown in FIG. 5 to the use position shown in FIG. 1, or vice versa. But, if the seat back (20) is unfolded or flipped over from the seat cushion (16), the cam (56) does not depress on the detector (52) as shown in FIG. 7(B). In that case, the detector (52) detects that the seat back (20) has been situated away from the seat cushion (16) and sends an "off" instruction to the CPU which in turn gives stop instruction to the motor (M). Thus, as far as the seat back (20) is unfolded from the seat cushion (16), even if the start switch (11) is turned on, the motor (M) dose not operate under the control of the CPU, and therefore, the unfolded seat portion (18) is not displaced to any of the afore-stated use position and the afore-stated non-use storage position.

As shown in FIGS. 8(A) and 8(B), a lock mechanism (58) and a manual lock lever (57) are provided in the bottom side of the seat cushion (16) so as to lock and unlock the seat cushion (16) to and from a striker (60) fixed on the floor (25), as is known. Namely, the lock mechanism (58) comprises a lock plate (61) and an actuator plate (62), both of which are rotatably supported therein. The manual lock lever (57) comprises a lever (65) having one end operatively connected with the actuator plate (62) and another end connected with a strap (66) extending outwardly of the seat cushion (16). As shown in FIG. 8(A), the lock plate (61) is engaged with the striker (60), while being biased by a spring (61A) to normally retain the lock plate (61) in engagement with the striker (60). Under such state, the actuator plate (62) is engaged with such lock plate (61).

Designations (64A) and (64B) denote a first lock sensor and a second lock sensor, respectively. Those first and second lock sensors (64A) (64B) are provided to insure ascertaining whether the seat cushion (16) is locked to or unlocked from the striker (60) or the floor (25). The second lock sensor (64B) may for instance comprise: a magnetic piece (67) and an electromagnetic sensor element (68). As understandable from FIGS. 9 and 10, the two lock sensors (64A) (64B) are electrically connected via the CPU and relays with the geared motor (12) or the motor (M). Normally, as shown in FIG. 8(A), with the lock plate (61) being locked to the striker (60), the lever (65) is out contact with the first sensor (64A), while the magnetic piece (67) is disposed at a point where the electrormagnetic sensor element (68). Hence, the locked state where the seat cushion (16) is locked to the striker (60) is detected by those two sensors (64A) (64B).

When the strap (66) is drawn outwardly, the lever (65) is rotated anticlockwise and brought to contact with the first sensor (64A), while simultaneously causing anticlockwise rotation of the actuator plate (62) in a direction away from the lock plate (61), as shown in FIG. 8(B). Then, as in the FIG. 8(B), the actuator plate (62) is disengaged from the lock plate (61), and at the same time, an actuator rod (63) of the actuator plate (62) presses the lock plate (61), overcoming the biasing force of the spring (61A), whereby the lock plate (61) is rotated clockwise and disengaged from the striker (60), thereby unlocking the seat cushion (16) from the floor (25). At this point, the lever (65) is in contact with the first lock detector (64A) which sends a signal to the CPU, and responsive thereto, the CPU determines that the lock mechanism (58) is now placed in an unlocked state. In addition thereto, the magnetic piece (67) is moved away from the electromagnetic sensor element (68), responsive to which, the second lock detector (64B) also sends a signal to the CPU which finally determines that the lock plate (61) is disengaged from the striker (60) and ascertains the unlocked state of the seat cushion (16) from the striker (60). The CPU then executes proper processing to establish a closed circuit between the start switch (11) and the motor (M), though not shown.

Accordingly, due to the foregoing triple detection system, if a user happens to turn on the start switch (11) without knowing that the seat back (20) is not folded onto the seat cushion (16) and the seat (S) is still locked to the striker (60) or the floor (25), the geared motor (12) is not operated, which insures to prevent malfunction and damages in the laterally folding mechanism (10) and other associated parts and elements.

In the present invention, it may be arranged such that, when it is desired to retract the seat (S) from the use position to the non-use storage position, by simply drawing the strap (88) to depress on or activate the first lock sensor (64A), the motor (M) will be operated without turning on the start switch (11)

to cause displacement of the seat (S) to the non-use storage position. That is, in brief, as suggested in FIG. 10, insofar as the detector (52) is "on", irrespective of the "off" state of start switch (11), if the first lock sensor (64A) is turned on by drawing the strap (88) outwardly, the second lock sensor (64B) is turned off as stated previously, and those "on" and "off" states respectively of the two lock sensors (64A) (64B) are transmitted to the CPU. Responsive to all such conditions, the CPU sends instruction signal to the geared motor (12) for operation, so that, as shown in FIG. 4, the folded seat portion (18) is rotated upwardly via the laterally folding mechanism (10) from the use position toward the non-use storage position.

While having described the present invention thus far, it should be understood that the present invention is not limited to the illustrated embodiments, but any modification, replacement and addition may be applied thereto without departing from the scope of the appended claims.

What is claimed is:

1. A laterally retractable vehicle seat which includes a seat portion comprising a seat cushion and a seat back rotatably connected with said seat cushion in combination with a body of a vehicle and a floor of the vehicle, said seat portion being displaceable in a direction laterally of said vehicle body towards a selected one of: a use position where the seat portion is set on said floor of said vehicle; and a non-use storage position where the seat portion is stored adjacent to said body of said vehicle, said laterally retractable vehicle seat comprising:

a support base element provided in said body of said vehicle;

a connecting arm having: one end rotatably connected via a shaft with said support base element; and another end fixedly connected with said seat portion;

a motor securely provided in said seat portion, said motor being electrically connected with said switch element;

a drive shaft rotatably supported in said seat portion so as to be in parallel with said shaft associated with said connecting arm;

a drive transmission operatively connected between said motor and said drive shaft;

a first support link having: one end fixed to said drive shaft; and a free end; and a second support link having: one end pivotally connected with said support base element; and another end pivotally connected with said free end of said first support link;

wherein operation of said motor by turning on said switch element results in rotation of said drive shaft which in turn causes movement of both said first and second support links, thereby causing rotation of said connecting arm relative to said shaft, whereby said seat portion is displaced in said direction laterally of said vehicle body towards a selected on of said use position and said non-use storage position.

2. The laterally retractable vehicle seat as claimed in claim 1, wherein said seat cushion of said seat portion includes: one lateral side facing to said support base element; and another lateral side adjoining said one lateral side, and wherein said drive shaft and said another end of said connection arm are disposed adjacent to said one lateral side of said seat cushion and said motor is securely connected with said another lateral side of said seat cushion.

3. The laterally retractable vehicle seat as claimed in claim 1, wherein said seat cushion of said seat portion includes: one lateral side facing to said support base element; and another lateral side adjoining said one lateral side, wherein said seat cushion further includes a seat cushion frame provided therein, said seat cushion frame including; one lateral frame member disposed adjacent to and along said one lateral side; and another lateral frame member disposed adjacent to and along said another lateral side, wherein said another end of said connecting arm is fixedly connected with said one lateral frame member of said seat cushion frame, wherein said drive shaft is rotatably supported by said another lateral frame member of said seat cushion frame, and wherein said motor and said transmission means are securely connected with said another lateral frame member of said seat cushion frame.

4. The laterally retractable vehicle seat as claimed in claim 3, wherein said motor is a geared motor having a pinion gear, wherein a sector gear is integrally fixed to said drive shaft at a point adjacent to said another lateral frame member of said seat cushion frame, and wherein said transmission means comprises a reduction gear unit including: a first gear in mesh with said pinion gear; and a second gear in mesh with said sector gear.

5. The laterally retractable vehicle seat as claimed in claim 1, wherein a limit switch element is provided, which detects excessive operation of said motor.

6. The laterally retractable vehicle seat as claimed in claim 1, wherein said motor is a geared motor having a pinion gear, wherein a sector gear is integrally fixed to said drive shaft, and wherein said transmission means comprises a reduction gear unit including: a first gear in mesh with said pinion gear; and a second gear in mesh with said sector gear.

7. The laterally retractable vehicle seat as claimed in claim 1, which farther comprises a detector element provided to said seat portion, said detector element being adapted to detect a state where said seat back is folded onto said seat cushion with such an arrangement that, only upon said detector element detecting said state, said switch element is operable to cause operation of said motor.

8. The laterally retractable vehicle seat as claimed in claim 1, which farther comprises: a manual lock element provided to said seat portion, said manual lock element being operable manually to lock and unlock said seat portion to and from said floor of said vehicle; and a lock sensor element for detecting a selected one of: a locked state where said seat portion is completely locked to said floor of said vehicle; and an unlocked state where the seat portion is completely unlocked from said floor of said vehicle.

* * * * *